July 26, 1960 M. COGNIAT ET AL 2,946,220
DIFFERENTIAL FLOWMETER
Filed Feb. 24, 1958 3 Sheets-Sheet 1

INVENTORS.
Marcel Cogniat
Michel de Fromont
Paul Jacquemier

BY Webb, Mackey & Burden
THEIR ATTORNEYS

INVENTORS.
Marcel Cogniat
Michel de Fromont
Paul Jacquemier

BY Webb, Mackey & Burden
THEIR ATTORNEYS

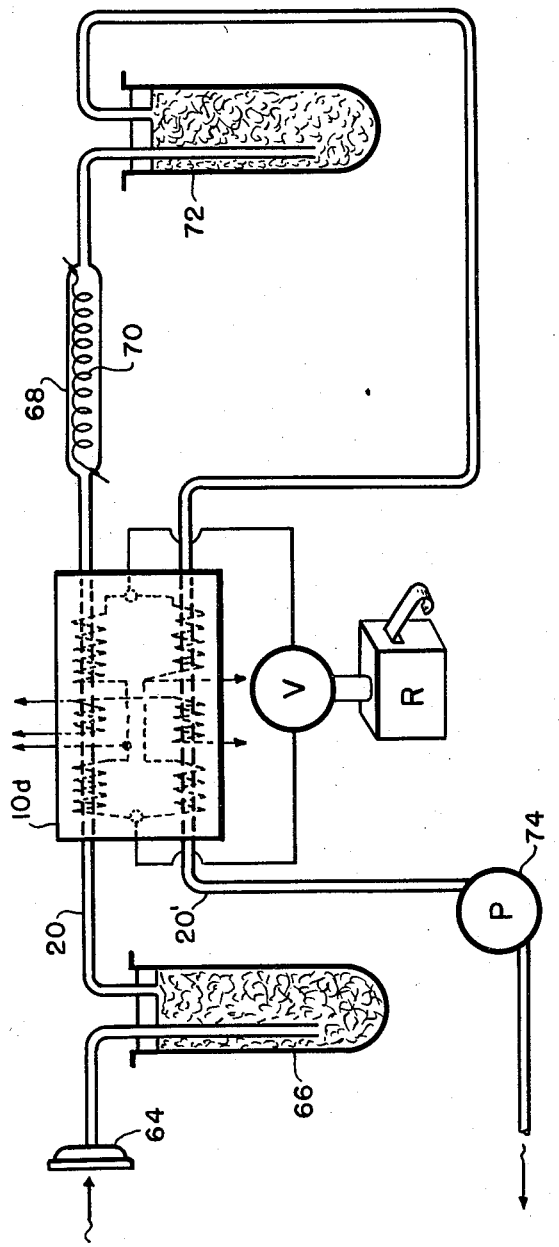

United States Patent Office 2,946,220
Patented July 26, 1960

2,946,220

DIFFERENTIAL FLOWMETER

Marcel Cogniat, Pierre-Benite, Michel de Fromont, Lyon, and Paul Jacquemier, Marseille, France, assignors to Societe d'Electro-Chimie, d'Electro-Metallurgie et des Acieries Electriques d'Ugine, Paris, France, a corporation of France Filed Feb. 24, 1958, Ser. No. 717,173

Claims priority, application France Mar. 1, 1957

2 Claims. (Cl. 73—196)

The present application relates to flowmeter apparatus of a type which takes simultaneous electrical measurements of two or more streams of flowing gases for purposes of continuously automatically determining their relative flows. Among meters of this general type, one form measures and compares the input flow and the residual gas output from a titration process of complex gases, in which instance the apparatus is termed a differential flowmeter by reason of its function to give readings of flow differential as a direct measure of the component being titrated out of the complex gas. Thus in that case a continuing analysis is had of the proportions of the one component of a mixture of one or several other gases.

For the above purposes, the present apparatus uses the same thermal flow-sensing principle and a compounded form, i.e. having dual flow tubes, of the basic sensing head device disclosed in the single-tube flowmeter application filed in the names of Cogniat et al., U.S. Serial No. 710,674, filing date January 23, 1958, now Patent No. 2,896,452. In contrast however, this seeming duplication of parts thereof materially broadens the field for a compact type of integrated flowmeter apparatus and the possibilities are of far reaching value for reasons hereinafter specified.

Briefly, in reference to the noted co-pending Cogniat et al., application Serial No. 710,674, the single flow tube just referred to forms a metal-walled straight central conduit through an isothermal enclosure in which it is set, with the opposite ends being fixed therein to support the straight center section of the conduit which at its midportion carries a heating coil and at the immediate sides of that coil two identical windings. The thermal principle which is involved is that the difference in resistance of these two unequally heated windings at the time of passage of gas flowing through the tube is proportional to the flow of small values of gas flow. The gas flow is unidirectional, with the range of flows contemplated being of the order from 200 cubic centimeters per hour to a few liters per hour and, within that range and also within slightly higher ranges as herein contemplated, the heat unbalance between the windings depends entirely on how active the gas circulation is. Resistances are measured in accordance with conventional electrical practices, for instance a Wheatstone bridge circuit is employed in which the flow difference reading is conveniently referred to a calibrated reading established by known resistors, the reference voltage of which is accurately predetermined.

The present apparatus utilizes a plurality of flow tubes operating according to the foregoing principles to provide a differential flowmeter operation or at least a like type of flowmeter operation, i.e. operation in a maner to compare two or more flows simultaneously, these flows being either serially connected or connected for parallel flow. Based on this comparison the operation of the apparatus proceeds with the derivation of a single electrical quantity from the combined output of the group so as to indicate their sum, difference, or the ratio of their readings to one another. Such derived reading has obvious value in many general and special applications and can be coupled in a maner to supply the output to a recording instrument for automatically recording the value or coupled to directly operate a ratio-control valve for the flows or both.

In the field of chemistry the numerical ratio between flows is critical in familiar chemical processes, for example, the titration process above indicated wherein the two flows are serially connected and it becomes essential to find the differential between the complex gas flow before titration and its residual quantity after removal of the titrated component, thereby accurately determining the proportions of the gas being analyzed in terms of the differential produced due to titrated components.

Similar parallel-flow arrangements are commonly employed such as when a gas fed process requires two or more gases to be fed simultaneously in fixed proportion to properly sustain the process. The ratio-control over the flows is afforded by means of a valve provided in one or more of the flow lines and operating with a regulatory function employing familiar servo-mechanism techniques. These simple examples indicate some of the possibilities through utility of the present apparatus.

For purposes of the above, the instant invention takes advantage of certain fundamental relationships which may be set up from an electrical standpoint upon proper analysis of the series-connected upper branch $R_3 R_4$ in conjunction with the series-connected lower branch of resistors $R'_3 R'_4$ in a conventional Wheatstone bridge apparatus. Under conditions where the input resistance of the measurement circuit is large in comparison with the respective resistors $R_3 R_4 R'_3 R'_4$, the unbalance voltage $V$ existing at the juncture terminals of the measuring apparatus may, as a first approximation, be established according to Ohm's law in relation to the feeding voltage as follows:

$$(1) \quad \frac{V}{E} = \frac{R_3 R'_4 - R'_3 R_4}{(R_3 + R_4)(R'_3 + R'_4)}$$

The numerator and the denominator of equation 1 are separately operated upon, the denominator being mathematically treated first. Substituting therein, inasmuch as $R_3 + R_4 = R'_3 + R'_4 = 2R$ approximately:

$$(2) \quad \frac{V}{E} = \frac{1}{4R^2}(R_3 R'_4 - R'_3 R_4)$$

Expanding:

$$(3) \quad \frac{V}{E} = \frac{1}{4R^2}\left(\frac{1}{2}(R_3 R'_4 - R'_3 R_4) + \frac{1}{2}(R_3 R'_4 - R'_3 R_4)\right)$$

$$(4) \quad \frac{V}{E} = \frac{1}{4R^2}\left(\frac{1}{2}\left(\frac{R'_3}{R'_3} \cdot R_3 R'_4 - \frac{R'_4}{R'_4} \cdot R'_3 R_4\right) + \frac{1}{2}\left(\frac{R_4}{R_4} \cdot R_3 R'_4 - \frac{R_3}{R_3} \cdot R'_3 R_4\right)\right)$$

$$(5) \quad \frac{V}{E} = \frac{1}{4R^2}\left(\frac{1}{2} R'_3 R'_4 \left(\frac{R_3}{R'_3} - \frac{R_4}{R'_4}\right) + \frac{1}{2} R_3 R_4 \left(\frac{R'_4}{R_4} - \frac{R'_3}{R_3}\right)\right)$$

$$(6) \quad \frac{V}{E} = \frac{1}{2} \cdot \frac{1}{4R^2}\left(R'_3 R'_4 \left(\frac{R_3}{R'_3} - \frac{R_4}{R'_4}\right) - R_3 R_4 \left(\frac{R'_3}{R} - \frac{R'_4}{R_4}\right)\right)$$

Substituting, inasmuch as approximately the factors $R'_3 = R'_4 = R$ in the first term of equation 6 and, inasmuch as approximately the factors $R_3=R_4=R$ in the second term:

(7) $$\frac{V}{E}=\frac{1}{2}\cdot\frac{1}{4R^2}(R(R_3-R_4)-R(R'_3-R'_4))$$

(8) $$\frac{V}{E}=\frac{1}{2}\cdot\frac{1}{4R}((R_3-R_4)-(R'_3-R'_4))$$

(9) $$\frac{V}{E}=\frac{1}{2}k_1((R_3-R_4)-(R'_3-R'_4))$$

For small flows, the hereinabove stated relationship of the magnitude of flow being proportional to the resistance difference between resistor legs of each branch is expressed mathematically as follows:

(10) $$d=\frac{1}{k_2}(R_3-R_4)$$

(11) $$d'=\frac{1}{k_3}(R'_3-R'_4)$$

From (9), (10) and (11):

(12) $$\frac{V}{E}=\frac{k_1}{2}(dk_2-d'k_3)$$

Multiplying through to simplify, is accomplished within the bracketed term of the equation by bringing-in the constant $k_1$ which when united with the respective constants $k_2$ and $k_3$ already within the brackets may be designated combined constants $k$ and $k'$ respectively, these latter constants amounting to sensitivity coefficients in the resistors which by proper association electrically sense the flows in the two tubes and of which the upper branch in the Wheatstone bridge is physically associated with one flow tube and the lower branch with the other:

(13) $$\frac{V}{E}=\frac{1}{2}(kd-k'd')$$

Relations derived from fundamental Equation 2, such as Equation 13 and other modifications thereof will be seen to be used to advantage in the instant invention. Further features, objects and advantages thereof will be pointed out or become apparent when for a better understanding, reference is made to the following description taken in conjunction with the accompanying drawings which show a preferred embodiment of the invention and in which:

Figure 8 is a further modified continuous gas analyzer.

Figure 1:
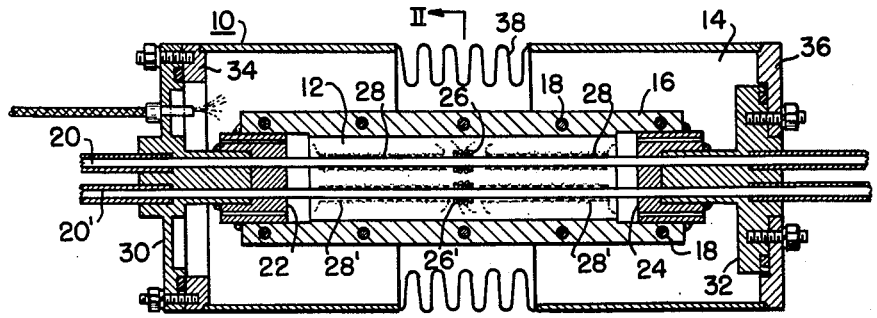
Figure 1 is a longitudinal sectional view of a dual-tube flowmeter device embodying the present invention.
Figure 2:
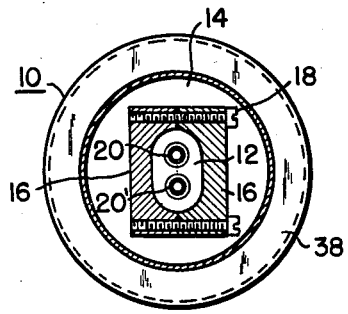
Figure 2 is a transverse sectional view taken along lines II—II of the device of Figure 1.

In more detailed reference to the drawings, the present dual-tube flowmeter device 10 according to Figures 1 and 2 is formed of a pair of co-axial containers arranged one within another to form a housing and together defining an isothermal inner chamber 12 and a sealed outer chamber 14, each of which is generally annular shaped. A copper body of considerable mass forming a rigid enclosing container for the isothermal chamber 12 consists of a pair of metal halves 16 which have semi-oval interiors and which produce a rectangular block shape on the outside when secured together by an upper and lower series of bolts 18.

Two parallel gas flow tubes 20 and 20' have their midportions supported symmetrically spaced between the two halves 16 and the supporting portions of each tube pass through body mounting members 22 and 24 which form the end walls of the chamber 12 and which are accurately bored to insure good thermal contact at the points of issuance of tubes 20 and 20'.

The flow tubes 20 and 20' are of a thin walled metal construction having an unrestricted interior of uniform diameter and on the outside at their midportion these tubes carry respective electric heaters 26 and 26'. Each heater is a coil straddled by two identical windings 28 or 28' as the case may be and individually formed by wrapping a length of electrically insulated platinum wire in helical formation one at each side of the associated coil and fixed in place by means of a suitable varnish coating.

The body mounting members 22 and 24 have outer bearing surfaces and inner bearing surfaces on which the copper body halves 16 are slidably mounted as one unit and within which there are slidably received the inner extensions of a pair of housing end closure members 30 and 32. This double slidable relation forms no per se part of the present invention and is disclosed and claimed in the noted co-pending Cogniat application, U.S. Serial No. 710,674; similarly to that application the bearing surfaces are welded at the points indicated in this application to rigidly consolidate the inner parts or core of the housing.

The outside of the housing of the device 10 comprises a cylinder having attachment flanges 34 and 36 at the ends secured by threaded fasteners to the end closure members 30 and 32 and consisting of tubular body halves therebetween and an intervening bellows 38 of corrugated metal smoothly welded to the inner ends of the halves to form an airtight expansion joint about the dead air space in chamber 14.

Figure 3:
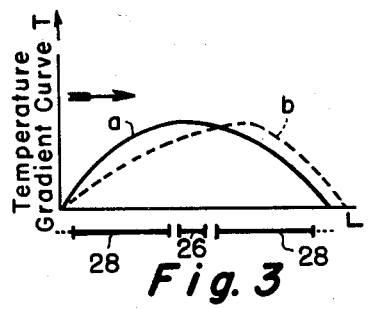
Figure 3 is an operational curve showing a shift of the temperature gradient curve in a tube due to the presence of gas flowing therethrough.

The thermal operation of the device 10 is understood from Figure 3 where, in the absence of fluid flow, the heat introduced by either coil 26 or 26' creates a symmetrical temperature distribution according to the temperature gradient curve $a$ along the length L of the tube. Circulation of fluid in the direction shown by the arrow in Figure 3 causes the form $a$ of the curve to change to form $b$. It is thus seen that the upstream windings cool with the drop in temperature of the tube half which they surround so as to decrease in electrical resistance. However, the remaining half of each tube which is in contact with the heated gas downstream undergoes a rise in temperature to heat the surrounding winding thereabout and raise its resistance.

Figure 4:
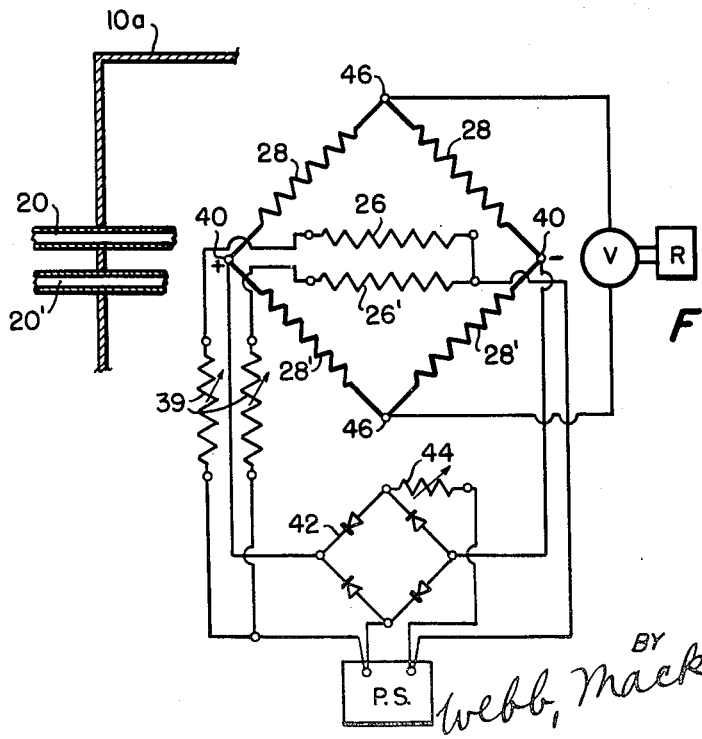
Figure 4 is a schematic diagram of a Wheatstone bridge system utilizing the device of Figure 1 as a sensing head to determine either the sum or difference flows electrically, depending on the connections.

A Wheatstone bridge apparatus is shown in Fig. 4 which utilizes general Equation 13 above in a manner enabling the device 10 to operate as a highly accurate sensing head 10a in an electrical flowmeter system. The heating coils 26 and 26' have a common A.C. power source from which they are individually fed in parallel through a pair of adjustable resistors 39. The power source supplies direct current to the input terminals 40 of the bridge through a conventional rectifier 42 the output of which is adjusted by a variable resistor 44.

The respective series-connected resistors 28 and 28' form the upper and lower branches of the bridge connected between the input terminals 40 thereof, and the terminal output of the intervening measuring bridge junction 46 is measured by a meter V which may be a sensitive voltmeter and which is connected to a continuous automatic recorder R. Each junction terminal output varies in potential from the base calibrated reference voltage thereof measured under the symmetrical temperature gradient curve conditions illustrated by solid line $a$ in Fig. 3, and corresponding to a voltmeter reading of $V=0$.

Examples which follow in the application of the useful output of the sensing head $10a$ are intended to illustrate the present invention for a better understanding. They are by no means exhaustive of uses possible, being disclosed with the desired purpose of a fuller description and not of limitation.

Example I

In a special case of general Equation 13 where the gases in the dual tubes are identical or such generally similar behavior therein as to conform to the same sensitivity coefficient $k$, we are warranted in setting the apparatus of Fig. 4 with the upper pair of windings 28 adjusted to exactly equal the lower ones 28' for the condition $k=k'$ whereupon:

$$(14) \qquad \frac{V}{E} = \frac{1}{2}k(d-d')$$

Therefore the output bridge measurement to meter V and to the recorder R is a direct reading of the difference of flows which is desired to be compared and which the recording instrument R directly records.

Example II

In the particular case where $k$ and $k'$ are the same in magnitude but where flow is reversed in one the tubes 20 and 20' so that the arrows are not of the same direction as in Fig. 4, the algebraic sign of the sensitivity coefficients $k$, $k'$ is changed to the opposite relation where $k=-k'$ and thereupon:

$$(15) \qquad \frac{V}{E} = \frac{K}{2}(d+d')$$

Therefore the measuring bridge output represents the sum of the flows which the recording instrument R directly records as such.

Example III

A special situation involving the just noted particular case $k=-k'$ occurs where the dual tubes carry equal but opposite flows, i.e. $d=d'$, and $k=-k'$ whereupon:

$$(16) \qquad \frac{V}{E} = \frac{K}{2}(2d)$$

In this special situation in comparison to a single-tube flowmeter operation, the present dual tube sensing head responds to any given flow with exactly double the reading on the meter V making it capable of detecting exceedingly small flows and in fact imparting to the meter V twice the energizing voltage and twice the sensitivity of the single tube flowmeter which, as shown, simply compares the output to a known base reference voltage.

The present device 10 affords the opportunity for controlled-ratio of flow automatically. Where such ratios are concerned it is usually the case that the ratio of the two fluid flows $$\frac{d}{d'}$$

is desired constant and equal to $w$ for instance, whereupon the sensitivity coefficients will bear the relation:

$$(17) \qquad \frac{k}{k'} = \frac{1}{w} \text{ or } k' = kw$$

Substituting in general equation 13:

$$(18) \qquad \frac{V}{E} = \frac{1}{2}(kd - kwd')$$

$$(19) \qquad \frac{V}{E} = \frac{K}{2}(d - wd')$$

Figure 5:
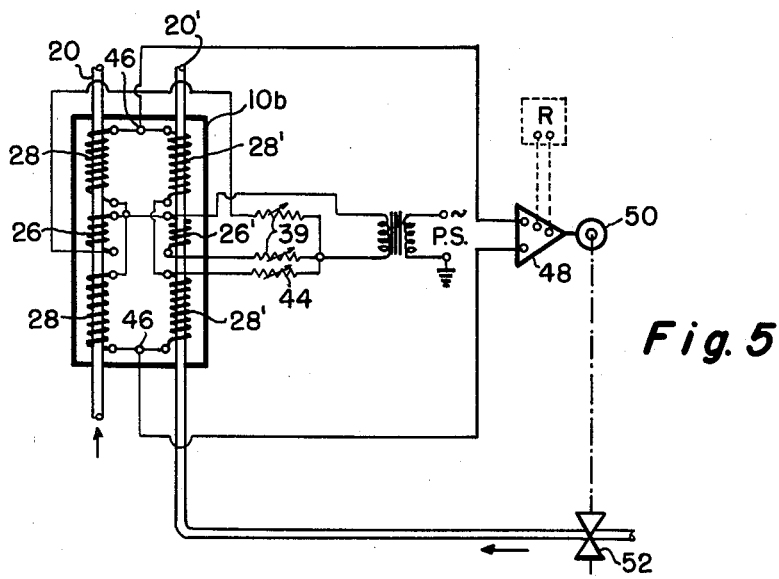
Figure 5 is a modification of the Wheatstone bridge system utilizing the device to control the ratio of flows.

Another application of the Wheatstone bridge apparatus is shown in Fig. 5 which utilizes the general Equation 19 above in a manner enabling the device 10 to operate as a highly accurate sensing head $10b$. The heating coils 26 and 26' are supplied from an A.C. power source through individual variable resistors 39 for adjusting them in balanced relation in a manner similar to Fig. 4 preceding. The Wheatstone bridge branches formed by the windings 28 and 28' are in circuit with a variable resistor 44 but are fed directly from a common A.C. power source. Gas flow through the flow tubes 20 and 20' is in the direction of the arrows shown in Fig. 5.

An amplifier 48 is connected to the output junctures forming the bridge measurement terminals 46 and control-signals emitted by the amplifier 48 are fed to a metering motor 50. In the manner of known servo-mechanisms the metering motor 50 is mechanically connected to a flow controlling valve element 52 interposed ahead of one of the flow tube paths. A recorder R may be provided for continuously automatically recording the output of the amplifier 48 to detect the occurrence of slight variations from the controlled ratio of flow desired.

In a case where the voltage V of Equation 19 is desired to be zero at steady flow condition, then obviously $d=wd'$ whereupon we are warranted in this case in selecting coils and setting the apparatus so that their resistances have a sensitivity coefficient ratio $$\frac{1}{w}$$

according to Equation 17 foregoing.

Example IV

If the flow ratio $$\frac{d}{d'}$$

is to be held constant and equal to 3 for instance, the detected voltage V will be zero when $$\frac{k}{k'} = \frac{1}{3}$$

so that $d=3d'$. Moreover whenever $$d \text{ exceeds } 3d', \quad V$$

is positive and if $$d \text{ is less than } 3d', \quad V$$

is negative. Depending therefore on the polarity and the magnitude of the voltage signal fed by the amplifier 48 to the metering motor 50, the valve element 52 is automatically adjusted in the proper direction toward or from its seat and in the proper spaced relationship thereto to keep the flow in the controlled tube in proper fixed ratio to the flow in the other tube.

The foregoing examples are based on small flows which, if exceeded, no longer follow the precise relations stated. That is to say the voltage measured does not increase indefinitely with gas flow in a thermal flowmeter but instead becomes steady at a very flat maximum which it reaches by passing through not so simple a curve relation as previously considered. Mathematically it has been determined that this higher-flow relation can be substantially duplicated if, as an approximation, the respective resistance changes of the bridge branches are treated as varying as an exponential function of the flow in the higher flow range considered. These resistances are written as follows:

$$(20) \qquad R_3 = R\left(1 - \alpha t_0\left(1 - e^{\frac{d}{-d_0}}\right)\right) R_4 = R\left(1 + \alpha t_0\left(1 - e^{\frac{d}{-d_0}}\right)\right)$$

$$(21) \qquad R'_3 = R\left(1 - \alpha t_0\left(1 - e^{\frac{d'}{-d_0}}\right)\right) R'_4 = R\left(1 + \alpha t_0\left(1 - e^{\frac{d'}{-d_0}}\right)\right)$$

wherein under this notation $d_0$ is a value of flow corresponding to voltage VI equalling two-thirds of its maximum value $V_{max}$.

$\alpha$ is the temperature coefficient of the metal (platinum or the like) forming the windings.

$t_0$ is a temperature of reference.

Merely reversing the polarity of the voltmeter V enables general Equation 2 to be rewritten where needed as follows:

(22) $$\frac{V}{E} = \frac{1}{4R^2}(R'_3 R_4 - R_3 R'_4)$$

From Equations 20, 21 and 22:

(23) $$\frac{V}{E} = \frac{\alpha t_0}{2}\left(e^{\frac{d'}{-d_0}} - e^{\frac{d}{-d_0}}\right)$$

The above general Equation 23 has application in many areas but particularly applies to a continuous gas analyzer utilizing the titration principle.

If $x$ equals the titratable component which is present in a complex gas and which is in "$x$" proportion thereto, the flow of residual gas after titration will be according to the equation:

(24) $$d' = d(1-x)$$

From (23) and (24):

(25) $$\frac{V}{E} = \frac{\alpha t_0}{2}\left(e^{-\frac{d(1-x)}{d_0}} - e^{\frac{-d}{d_0}}\right)$$

At the point for a given fixed value of "$x$" where the shape of the above curve from Equation 25 reaches its flat maximum, we know that at that value the curve has a zero slope enabling us to take the partial derivative with respect to $d$ and to set that partial derivative equal to zero by conventional analysis as follows:

(26) $$\frac{\partial}{\partial d}\left(\frac{V}{E}\right) = 0$$

The solution of the equation yields:

(27) $$e^{-\frac{d(1-x)}{d_0}} \cdot \frac{1-x}{d_0} = e^{-\frac{d}{d_0}} \cdot \frac{1}{d_0}$$

(28) $$1-x = \frac{e^{-\frac{d}{d_0}}}{e^{-\frac{d(1-x)}{d_0}}}$$

(29) $$1-x = e^{-\frac{d}{d_0} + \frac{d}{d_0} - x\frac{d}{d_0}}$$

Whereupon the general equation below results:

(30) $$1-x = e^{-x\frac{d}{d_0}}$$

Figure 6:
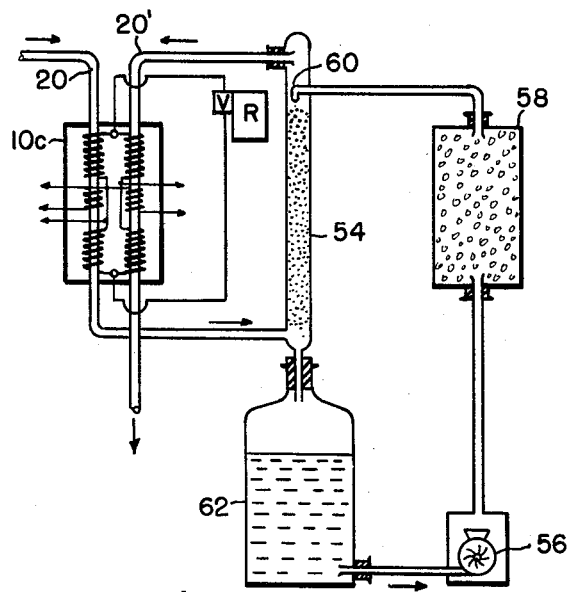
Figure 6 shows a continuous gas analyzer in which the Wheatstone bridge is modified and properly adjusted for recording the flow differential of higher flows.

A Wheatstone bridge apparatus is shown in Fig. 6 which utilizes the setting according to general Equation 30 above in a manner enabling the device 10 to function as the highly accurate sensing head 10c of a continuous gas analyzer. The output of the head 10c is fed to a continuous automatic recorder R and forms a differential flowmeter which receives through the flow tube 20 a constant flow of the gas inducted for analysis. This complex gas is fed through the absorption column 54 of a chemical apparatus for titration and the residual flow passes in the direction of the arrow through a second flow tube 20' in the flowmeter which may be connected to vacuum if desired. The absorption column 54 is approximately 30 centimeters long and holds glass balls. A pump 56 is connected to circulate an acidified potassium iodide solution through an iodine-fixing tank 58 holding active carbon and thence through a nozzle 60 which sprays the solution onto the glass balls in the column 54. This particular analyzer is sensitive to chlorine dioxide and the chlorine dioxide component in the complex gas inducted from the flow tube 20 is fed at the bottom of the column 54 in a manner causing the chlorine dioxide to be absorbed and undergo chemical reaction as it meets the oncoming solution; thereafter, as the first step of this titration process the resulting reaction releases the iodine of the reagent as follows:

(31) $$ClO_2 + 5IH \rightarrow 5/2 I_2 + ClH + 2H_2O$$

Due to the chemical absorption of the chlorine dioxide attended by release of the iodine in the above manner, the entire $ClO_2$ content is lost by the incoming gas and is carried downwardly in solution into a collecting vessel 62 from which the circulating pump 56 constantly draws.

Where "$x$" in Equation 30 is very small, the right hand side of the equation is for convenience of analysis expanded in known way into a mathematical series as follows:

(32) $$1-x = 1 - x\frac{d}{d_0} + \ldots$$

Retaining only the first term, we find that $d = d_0$ and it is thus apparent that so long as the flow rate $d$ maintained in the tube 20 stays somewhere at or below the reference flow $d_0$ so as to be slightly less than approximately the not-to-be-exceeded flow corresponding to $V_{max}$, then as an approximation we can say that the flow is without effect on the voltage reading V of Equation 25.

This feature of the process makes it important commercially because as a practical matter the flow therefore does not have to be regulated too strictly to nevertheless keep producing the flow $d$ desired and the latter can vary generally throughout the range just considered. The limits of this range are of course directly dependent upon the relatively high, relatively low, etc. value of "$x$" being encountered for instance where $0\% < x < 5\%$ or $45\% < x < 55\%$ etc.

*Example V*

Air containing a small value such as between 0 and 5% of chlorine dioxide is fed through the flow tube 20 for an analysis of the chlorine dioxide content in the apparatus of Fig. 6. The flow tubes 20 and 20' are of such diameter and length that the flow of the air is approximately one liter per hour to produce the exponential conditions of general Equation 25. Compared to other flow rates, this flow is relatively small and actually only about one-tenth of the flow required for operating other differential flowmeters. Under these conditions the quantity of iodine released is of the order of 30 grams per 24 hours within the range of chlorine dioxide specified, and thus only two liters of a tenth-normal potassium iodide solution is consumed during a 24 hour operation. Therefore a relatively small quantity of reagent is used and a considerable savings of the aggregate amount of reagent is possible over prior processes and yet the recorder R equally advantageously provides a continuous recording of the proportions, in a complex gas, of the constituent thereof which is being titrated.

Figure 7:
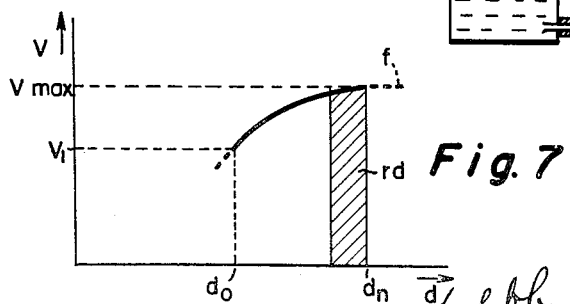
Figure 7 is an operational curve showing the behavior of the higher flows used with the analyzer of Figure 6.

The solid line portion of the curve of Fig. 7 shows a general higher flow condition as contemplated where approximately a fixed proportion "$x$" of a gas is to be titrated out of a more complex gas in accordance with general Equation 30 above. A reference flow $d_0$ is preferably selected to correspond to the voltage $V_1$ of the voltmeter which is two-thirds of $V_{max}$. The solid line portion of the curve is found to be approximately an exponential function from this point upward to the very flat maximum whence the curve retains a flat value indicated by the dotted lines $f$. So long as the flow rate maintained stays somewhere in the exponential range of being slightly less than approximately the not-to-be-exceeded flow $d_n$ on the curve, then as an approximation we can say that the flow is without effect on the voltage reading V, which therefore varies solely in dependence on "$x$." Thus the flow does not have to be regulated too strictly to produce the flow desired, and the desired flow is not held constant but allowed to vary at or above the value $d_0$ or can be more tightly held within the cross-hatched range $r_d$ for even more absolute precision of the apparatus, for all values of the parameter "$x$" approximately a preselected given value.

That is to say, the terms $\alpha$, $t_0$, $d$ and $d_0$ are numerically determined and substituted into Equation 25, whereupon by solution the V readings corresponding for instance to the range $45\% < x < 55\%$ are accurately forecast and, as the voltmeter readings fluctuate in operation, they are readily interpreted in terms of solved values of "$x$" quantity being titrated.

*Example VI*

In the case where the titrated component constitutes half of the complex gas being fed through the flow tube 20, then that proportion, $x=0.5$, is readily substituted in the general Equation 30 yielding $$(33) \qquad 1-0.5 = e^{-0.5\frac{d}{d_0}}$$

In this example therefore $$(34) \qquad d_n = 1.38 d_0$$

The not-to-be-exceeded flow $d_n$ is observed from flow-testing procedure on the apparatus from which the reference flow $d_0$ in Equation 34 is readily determined, thus enabling set limits on the desired flow $d$ to be established for the flow tube 20 of Fig. 6. Though the desired flow thereafter is not allowed to exceed the not-to-be-exceeded flow $d_n$ it is nevertheless effective for the present purposes of accuracy anywhere in this range or, for greater precision, anywhere within the tighter range $r_d$ according to the curve of Fig. 7.

Another continuous gas analyzer is shown in Fig. 8 which utilizes Wheatstone bridge apparatus in a sensing head 10d. The output of the head 10d is fed to a voltmeter V and further to a continuous automatic recorder R if desired, and the head forms a differential flowmeter which receives through a tube 20 a flow of foul air polluted with methane and inducted for analysis. Inducted air enters the system through an ordinary porous filter 64 and is dried in flowing through an absorber 66 which holds granulated potassium hydroxide and which is connected to the flow tube 20. Air leaving the flow tube 20 passes through a burner 68 containing a helically wound coil 70 of platinum wire which is heated to about 1200° C. and which causes combustion of the methane. Igniting the methane in the presence of the air releases carbon dioxide and water vapor which are absorbed in an absorber 72 similar to the absorber 66. The absorber 72 connects the burner 68 and a second flow tube 20' in the head 10d, and passes the residual flow of burnt air remaining to the latter where it is forced to return to the atmosphere by an air circulating pump 74.

The combustion reaction of the methane with the oxygen of the air is as follows:

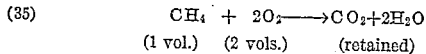

(35) $\qquad CH_4 + 2O_2 \longrightarrow CO_2 + 2H_2O$
(1 vol.) (2 vols.) (retained)

*Example VII*

Air containing between 0 and 4% methane is fed through the flow tube 20 for an analysis of its methane content by means of the apparatus of Fig. 8. The flow tubes 20 and 20' are of such diameter and length that the air flows at a rate of approximately 8 liters per hour but the pump 74 has a slightly higher design capacity. As formerly, careful flow regulation is unnecessary and a flow which fluctuates between as low as 6 liters per hour and as high as 9.5 liters per hour does not in this range affect the voltmeter reading V more than about ±2%. The titration equation of preceding Example V applies with one precaution being noted. The air loses methane in the ratio of 1 volume for each 2 volumes of its oxygen content lost, and therefore the proportioning of the windings 28, 28 to the windings 28', 28' in a 1:1 ratio in the sensing head 10d yields a titration reading which is three times the actual methane content present ("$x$" proportion). That is to say, where the flow change from the tube 20 to tube 20' shows a $-3\%$ difference, the initial methane content of the entering air is 1%. In one physically constructed embodiment of the analyzer apparatus of this example, the reading of the voltmeter V and the methane content of the air bore precisely a linear relationship to 7% of methane ($x=7\%$), and weekly adjustments of the analyzer insured consistent measuring accuracy to within ±0.10% of the actual methane content. The voltmeter V reading was 950±25 microvolts @ 1% actual methane content of the entering air.

It is apparent that the expansion joint formed by the bellows 38 in the device 10 when used as the foregoing sensing heads 10a, 10b, 10c and 10d enables the outer container to readily accommodate to the length of the rigid core therewithin as the core expands and contracts under thermal stresses. The heating coils 26 and 26' within the isothermal chamber 12 are slidably mounted for accurate final positioning upon the flow tubes and each heat-control resistor 38 which is provided, enables them to be varied to proper adjustment for accurate heat balance. The variable resistor 44 serves as an accurate sensitivity control in the Wheatstone bridge circuits and as a proper dropping resistor for keeping the bridge resistance in the desired proportion to the input voltage E from the power source. It is apparent that, with the accuracy available in the present apparatus, only a small sampling is necessary to be continuously taken in larger gas flow processes, from which these simultaneous, electrically-derived readings produce a combined electrical output indicative of their sum, difference, or a ratio as desired. This ratio can, of course, consist of the physical flow ratio $w$ directly between streams as exemplified by apparatus of the general type shown in Fig. 5 or, alternatively, in terms of a titration ratio $x$ by use of apparatus exemplifying the general type shown in Figs. 6 and 8. In the latter two examples, the titration proportion actually amounts, technically speaking, to the mathematical difference between the initial and residual streams divided by the value of that initial stream.

If the user provides additional space within the isothermal chamber 12 of the core, he can with slight modification insert additional tubes which, though being of satisfactory flow characteristics, will nevertheless result in greater difficulties of final calibration of the sensing head. This modification does however enable two or more flows to be compared to a third flow for recording purposes or for controlled-ratio purposes based upon that third flow or upon a suitable flow sum, difference, etc.

Further variations within the spirit and scope of the invention described are equally comprehended by the foregoing description.

We claim:

1. Flowmeter apparatus comprising central lengths of conduit for conducting streams of gas therethrough to be measured and having supported mid-portions and fixed opposite end portions, body halves forming a completed mass of metal when secured together and defining an isothermal chamber in which said lengths are fixed in spaced relation to one another between the halves, shiftable means for heating the supported midportions of each conduit length at a selected point to introduce heat into the associated gas stream at that point, first and second heat sensing means on each conduit length arranged one on each side of said heating means so that the first heat sensing means is cooled by the stream anterior to its heating point and heat from that heating point is transferred to the second heat sensing means by the heated stream posterior to said point in a manner whereby the magnitude of the temperature differential varies directly with the rate of gas stream flow, circuit means including said sensing means and output junction terminals the potential of which is a function of said stream flow rate and which varies in comparison with a fixed calibrated base reference voltage for each of the potentials, and flow rate comparison means connected to compare the potentials of said junction terminals for deriving an electrical quantity indicative of their sum, difference, or a ratio.

2. In flowmeter apparatus, a housing comprising a pair of containers arranged one within another with a dead air space between, means including end closure members for the housing affixing the location of each end of the inner container with respect to the outer container of the housing, said end closure members being sealed airtight to said outer container, flow tube means having end portions lodged in said end closure members and each having a midportion carrying heat dissipating and heat sensing resistor elements within said inner container, Wheatstone bridge means for circulating current through said resistor elements including connector means passing through sealed openings in the closure member at either end of said outer container and having output junction terminals the potential of which varies in comparison with a fixed calibrated reference voltage for each of the potentials, and means providing an expansion joint in the walls of the outer container for accommodation of the latter to changes in length of the inner container due to thermal expansion caused by said heat dissipating resistor elements.

References Cited in the file of this patent

UNITED STATES PATENTS

| | | |
|---|---|---|
| 1,416,572 | Packard | May 16, 1922 |
| 2,176,502 | Kurth | Oct. 17, 1939 |
| 2,275,317 | Ryder | Mar. 3, 1942 |
| 2,328,502 | Scheffler | Aug. 31, 1943 |
| 2,813,237 | Fluegel et al. | Nov. 12, 1957 |